United States Patent
Fiorvanti et al.

(10) Patent No.: US 6,785,082 B2
(45) Date of Patent: Aug. 31, 2004

(54) DISC DRIVE SERVO TRACK WRITER UTILIZING LOW-DENSITY GAS

(75) Inventors: Louis John Fiorvanti, Boulder, CO (US); Steve Thomas Sheeran, Longmont, CO (US); Randy Lee Oxley, Jamestown, CO (US); Jerry D. Pasi, Fort Collins, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/151,118

(22) Filed: May 20, 2002

(65) Prior Publication Data

US 2003/0081344 A1 May 1, 2003

Related U.S. Application Data

(60) Provisional application No. 60/340,997, filed on Oct. 30, 2001.

(51) Int. Cl.[7] ............................................. G11B 21/02
(52) U.S. Cl. ........................................................ 360/75
(58) Field of Search ................................ 360/75, 98.01; 318/476

(56) References Cited

U.S. PATENT DOCUMENTS

| | | | |
|---|---|---|---|
| 3,875,589 A | 4/1975 | Applequist et al. | |
| 4,068,268 A | 1/1978 | Idemoto et al. | |
| 4,514,672 A | 4/1985 | O'Gwynn | |
| 4,969,056 A | 11/1990 | Negishi et al. | |
| 4,980,783 A | 12/1990 | Moir et al. | |
| 5,243,479 A | * 9/1993 | Nakagoshi et al. | 360/98.01 |
| 5,341,255 A | 8/1994 | Starr et al. | |
| 5,465,182 A | 11/1995 | Ishikawa | |
| 5,585,912 A | 12/1996 | Shin et al. | |
| 5,654,841 A | 8/1997 | Hobson et al. | |
| 5,774,294 A | 6/1998 | Fioravanti | |
| 5,798,459 A | 8/1998 | Ohba et al. | |
| 6,018,437 A | 1/2000 | Weichelt et al. | |
| 6,084,738 A | 7/2000 | Duffy | |
| 6,097,565 A | 8/2000 | Sri-Jayantha et al. | |
| 6,119,534 A | 9/2000 | Dinsmore | |
| 6,144,178 A | 11/2000 | Hirano et al. | |
| 6,147,831 A | 11/2000 | Kennedy et al. | |
| 6,167,749 B1 | 1/2001 | Yanagisawa et al. | |
| 6,178,059 B1 | 1/2001 | Frees | |
| 6,207,252 B1 | 3/2001 | Shimomura | |
| 6,247,725 B1 | 6/2001 | Moller | |
| 2001/0003630 A1 | 6/2001 | Aonuma et al. | |
| 2001/0006435 A1 | 7/2001 | Ichihara et al. | |
| 2001/0008502 A1 | 7/2001 | Watanabe | |

FOREIGN PATENT DOCUMENTS

| | | |
|---|---|---|
| EP | 2000074349 | 3/2000 |
| EP | 2000275245 | 9/2000 |
| GB | 2334611 A | 8/1999 |

* cited by examiner

Primary Examiner—David Hudspeth
Assistant Examiner—K. Wong
(74) Attorney, Agent, or Firm—Fellers, Snider, et al.

(57) ABSTRACT

A method of writing servo patterns on a disc in a servo track writer includes sealing the STW to form an enclosed interior environment and then filling the STW with a low-density gas. Once the servo patterns are written to the disc, the low-density gas may be purged from the STW and recycled by directing the purged gas to a recovery system that separates the low-density gas from air. The disc may be preinstalled within a disc drive which in turn is loaded within the STW. Alternatively, the STW may comprise a multi-disc writer having a plurality of dedicated servo writing heads. The servo writer includes a cover having a sealable opening for loading either the disc drive in the STW or for loading a disc stack within the MDW.

15 Claims, 7 Drawing Sheets

DISC DRIVE SERVO TRACK WRITER UTILIZING LOW-DENSITY GAS

RELATED APPLICATIONS

This application claims priority of U.S. provisional application Serial No. 60/340,997, entitled "Method and Apparatus for Containment and Supply of an Inert Gas for Servo Track Writer," filed Oct. 30, 2001, and naming inventors Louis J. Fioravanti, Steve T. Sheeran and Randy L. Oxley.

FIELD OF THE INVENTION

This application relates generally to disc drive servo track writers, and more particularly to a servo track writer that is filled with a relatively low-density gas during the servo writing process.

BACKGROUND OF THE INVENTION

A disc drive typically includes a base to which various components of the disc drive are mounted. A top cover cooperates with the base to form a housing that defines an internal, sealed environment for the disc drive. The components include a spindle motor, which rotates one or more discs at a constant high speed, and an actuator assembly for writing information to and reading information from circular tracks on the discs. The actuator assembly includes a plurality of actuator arms extending towards the discs, with one or more flexures extending from each of the actuator arms. Mounted at the distal end of each of the flexures is a read/write head, which includes an air bearing slider enabling the head to fly in close proximity above the corresponding surface of the associated disc during operation of the disc drive. When the disc drive is powered down, the heads may be moved to a landing zone at an innermost region of the discs where the air bearing sliders are allowed to land on the disc surface as the discs stop rotating. Alternatively, the actuator assembly may move (unload) the heads beyond the outer circumference of the discs so that the heads are supported away from the disc surface by a load/unload ramp when the drive is powered down.

Disc drives typically include a servo system for controlling the position of the heads during both seeking operations (moving from one track to another) and read/write operations where the head must precisely follow the circular track. One type of servo system is a dedicated servo system where one entire disc surface contains servo information written as dedicated tracks. The remaining disc surfaces within the drive are thus used to store data on dedicated data tracks. Another type of servo system, known as an embedded servo system, provides servo information on each of the disc surfaces embedded between data portions. Well known state estimator circuitry is used to estimate the position of the heads at such times that the heads are not located over the embedded servo information.

With both dedicated and embedded servo disc drives, servo information or patterns are typically recorded on the target disc by a servo-track writer assembly ("STW") during the manufacture of the disc drive. One conventional STW records servo patterns on the discs following assembly of the disc drive. In this embodiment, the STW attaches directly to a disc drive and uses the drive's own read/write heads to record the requisite servo patterns to the mounted discs. An alternative method for servo pattern recording utilizes a separate STW apparatus having dedicated servo recording heads for recording servo patterns onto one or more discs simultaneously prior to the assembly of such discs within a disc drive.

Regardless of whether the servo information is written to the discs prior to assembly within a disc drive (i.e., using a separate STW apparatus having a dedicated actuator assembly) or following assembly of a disc stack within a disc drive (i.e., using the actuator assembly of the disc drive), it is crucial to provide a highly accurate positioning system with the STW to ensure accurate placement of the servo information on the discs. Specifically, a STW includes a positioning system for moving the actuator assembly and the attached heads across the disc surfaces during the servo writing procedure. The STW further includes a highly precise position detection system (often times incorporating a laser) for determining the position of the actuator assembly during the servo writing procedure. The position detection system provides correction signals to a motor within the positioning system to correct any errors in the position of the servo heads during operation of the STW.

In a continuing effort to store more data onto existing or smaller-sized discs, the disc drive industry is continually attempting to increase the capacity of each disc or platter by increasing the track density (i.e., the number of tracks per millimeter). Increased track density requires more closely spaced, narrow tracks and therefore enhanced accuracy in the recording of servo-patterns onto the target disc surface. However, as the track density increases, it becomes increasingly likely that errors will be encountered during the servo writing process. For example, the servo writing head may experience resonance vibrations during operation, which alters the position of the head as the servo information is written. Such vibrations can lead to inaccurate servo information being written to the disc surface which, in turn, limits the ability of the disc drive to accurately position the data head over the desired data track during normal track following procedures (i.e., during normal read and write operations).

The resonance vibrations experienced by the head during the servo writing process are typically caused by the high-speed rotation of the discs within the STW. That is, regardless of whether the STW utilizes the disc drive itself or a separate, dedicated apparatus, the rotation of the discs within the STW (at speeds of up to 10,000 revolutions per minute or more) causes a great deal of air turbulence within the STW. This turbulence results from friction between the spinning disc surfaces and the air within the STW and represents a known phenomenon in the disc drive art. The air turbulence within a STW also impacts other components within the STW such as the actuator arms and the heads flying over the discs.

One proposed solution for reducing air turbulence while writing servo information to the discs within a previously assembled disc drive is to partially fill the drive with helium gas during the servo writing process, thereby reducing the overall density of the gas within the disc drive. Specifically, reducing the density of the gas within the STW acts to reduce the frictional forces applied to the spinning discs, thereby reducing the drag-induced vibrations on the discs and the actuator assembly. Such solution relates only to STWs where the magnetic discs have already been assembled within the drive. Additionally, a key disadvantage to this solution is that it is difficult to maintain desired helium concentrations within the disc drive due to the tendency of the helium gas to escape the confines of the drive during operation of the STW.

Accordingly there is a need for an improved STW that can maintain desired concentrations of helium or other low-density gases in a cost-effective manner. Furthermore, there is a need for both a helium-filled STW that works with previously assembled disc drives as well as a helium-filled STW that has dedicated servo heads for writing servo information to discs prior to assembly of the discs within a disc drive. The present invention provides a solution to this and other problems, and offers other advantages.

SUMMARY OF THE INVENTION

Against this backdrop the present invention has been developed. In accordance with one embodiment of the present invention, a method writes servo patterns on a disc in a servo track writer ("STW") filled with a low-density gas to reduce drag-induced vibrations during the servo writing process. The method includes loading the disc within the STW and sealing the STW to form an enclosed interior environment. The sealed STW is then filled with a low-density gas until the concentration of the low-density gas within the STW preferably reaches a predetermined level. The STW is then activated to write servo patterns on the disc within the low-density gas environment of the STW. In one embodiment, the low-density gas may be purged from the STW and recycled at the conclusion of the servo writing procedure. The disc may be preinstalled within a disc drive, which in turn is loaded within the STW. Alternatively, the STW may comprise a multi-disc writer ("MDW") having a plurality of dedicated servo writing heads, wherein a stack of discs are loaded within the MDW. The servo writer includes a cover having a sealable opening for loading either the disc drive in the STW or for loading a disc stack within the MDW. When the low-density gas is to be recycled, the purged gas is directed from the STW or MDW to a gas recovery system that separates the low-density gas from air. In one preferred embodiment, the predetermined concentration of the low-density gas is at least 50 percent.

When the STW supports a separate disc drive, the method further includes powering up the disc drive in an air environment prior to filling the STW with the low-density gas, and then powering down the disc drive in an air environment after purging the low-density gas from the STW. On the other hand, when the MDW is optimized for use in a low-density gas environment, the method includes loading the dedicated servo writing heads onto the disc surfaces after the MDW is filled with the low-density gas, and then unloading the heads from the disc surfaces before purging the low-density gas from the MDW.

Another embodiment of the present invention is a servo writing assembly that includes a STW having a base for supporting a spindle motor that rotates the disc and a servo writing head that writes servo patterns on the rotating disc. A cover attached to the base forms an enclosed interior environment within the STW and includes a sealable opening for loading the disc within the STW. The cover further includes an inflow port for directing the low-density gas from the source into the interior environment of the STW prior to writing servo patterns on the disc and an outflow port to allow the low-density gas to be purged once the servo patterns have been written to the disc. In one embodiment, a gas recovery system connected to the outflow port separates the purged low-density gas from air.

When the disc, the spindle motor and the servo writing head are all preinstalled within a disc drive, the drive is inserted through the sealable opening in the cover and fixed within the interior environment of the STW. A conduit then connects the inflow port on the cover to an opening formed in the disc drive to direct the low-density gas to an interior of the disc drive. Alternatively, when the STW includes a plurality of dedicated servo writing heads, the spindle motor supports a plurality of discs for simultaneous servo pattern writing to each disc prior to installation of the discs within a disc drive. The discs are inserted through the sealable opening in the cover and fixed to the spindle motor within the interior environment of the STW.

The present invention can further be implemented as a servo writing assembly having a STW connected to a source of low-density gas for filling the STW with low-density gas prior to writing servo patterns on a disc, as well as means for recovering the low-density gas subsequent to writing the servo patterns on the disc. The gas recovery means preferably includes means for purging the low-density gas from the STW and means for separating the low-density gas from air. In one embodiment, the disc is preinstalled within a disc drive and the means for recovering the low-density gas includes a cover mating with a base of the STW to define a sealed interior environment within the STW. The cover includes a sealable opening to allow insertion of the disc drive within the STW. Alternatively, the STW has a plurality of dedicated servo writing heads for writing servo patterns simultaneously to a plurality of discs in a disc stack and the means for recovering the low-density gas includes a cover mating with a base to define a sealed interior environment within the STW. The cover includes a sealable opening to allow insertion of the disc stack within the STW.

These and various other features as well as advantages which characterize the present invention will be apparent from a reading of the following detailed description and a review of the associated drawings.

DETAILED DESCRIPTION

Figure 1:
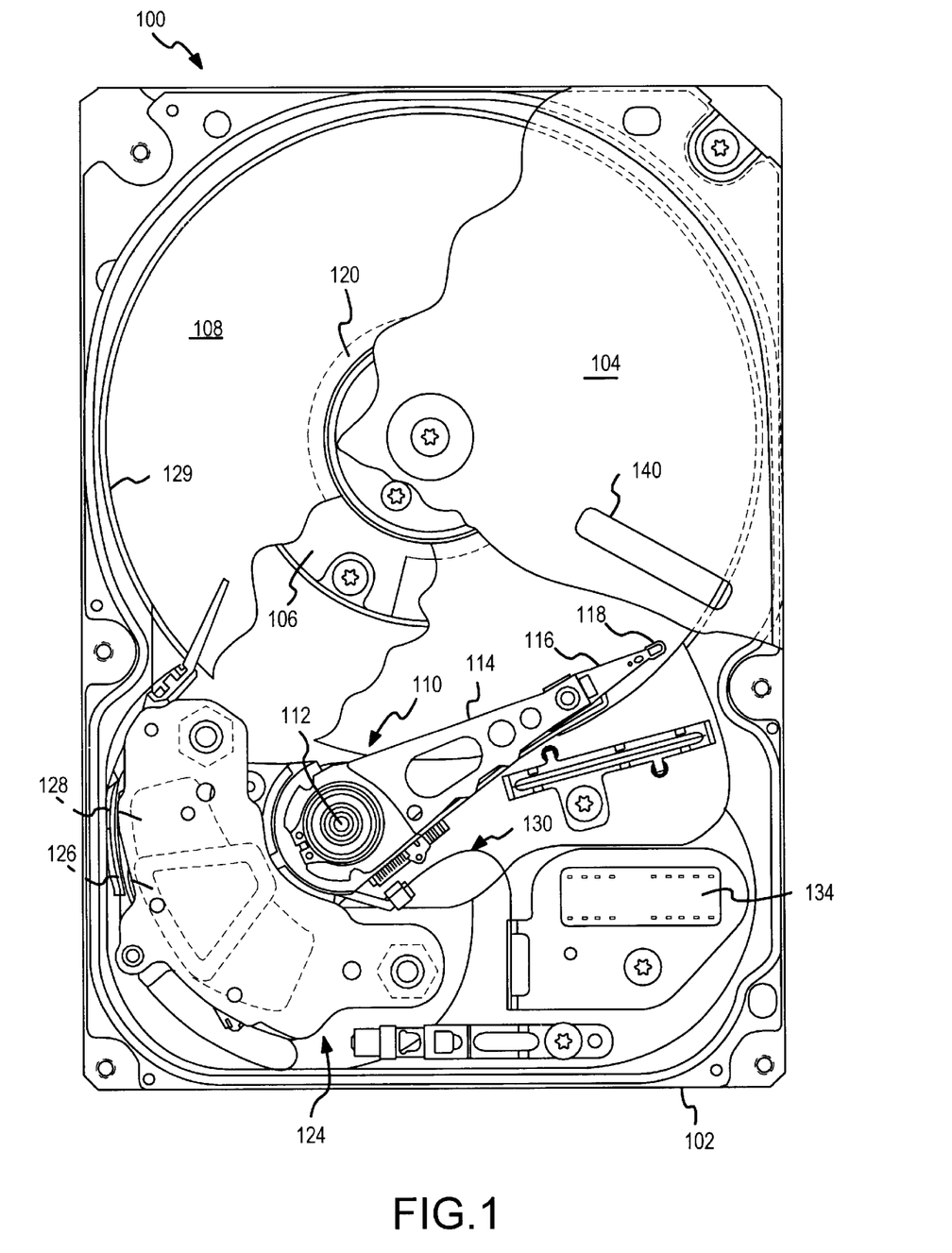
FIG. 1 is a plan view of a disc drive for use in a servo track writer incorporating a preferred embodiment of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form a housing that defines an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over a park zone 120 near the inner diameter of the discs 108 so that the flying heads 118 may land in the park zone 120 when the drive motor is de-energized. The heads 118 are secured over the park zone 120 through the use of an actuator latch arrangement, which prevents inadvertent rotation of the actuator assembly 110 when the heads are parked. Alternatively, the heads 118 may be moved to a ramp (not shown) beyond an outer diameter 129 of the discs 108.

A flex assembly 130 provides the requisite electrical connection paths for the actuator assembly 110 while allowing pivotal movement of the actuator assembly 110 during operation. The flex assembly 130 connects head wires (not shown) to a flex bracket 134 for communication through the base deck 102 to a disc drive printed circuit board (not shown) mounted to the bottom side of the disc drive 100.

The top cover 104 includes an elongated opening 140 extending over the discs 108 in a radial direction as shown in FIG. 1. The opening 140 approximates the arcuate path followed by the heads 118 as they move over the disc surface during operation of the drive 100. The opening allows the STW to detect the position of the heads 118 (such as through the use of a laser) during the servo writing operation. An adhesive sticker (not shown) is used to cover the opening 140 after the conclusion of the servo writing process. Additionally, the opening 140 preferably extends over the outer diameter 129 of the discs 108 to provide access to a separate clock head (not shown) that may be used to write a clock pattern to the outer diameter of the top disc 108. The clock pattern is written at the start of the servo writing procedure and is later read by the clock head (not shown) to provide a timing reference for the servo heads (e.g., the heads 118 of the disc drive 100) as the servo heads write the servo patterns to the discs 108. The procedure for writing a clock pattern to the disc 108 is well known in the art and thus will not be discussed further herein as the details of both the clock writing procedure and the servo writing procedure are not important to the present invention.

Figure 2:
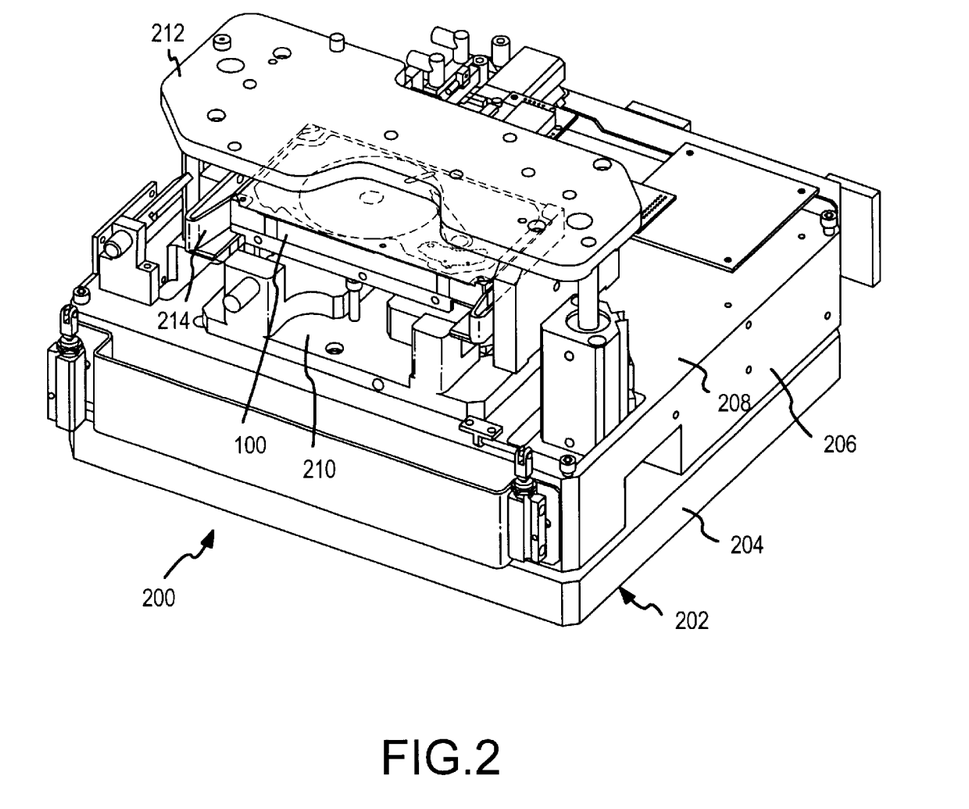
FIG. 2 is a perspective view of a STW in accordance with a preferred embodiment of the present invention incorporating the disc drive shown in FIG. 1.
Figure 3:
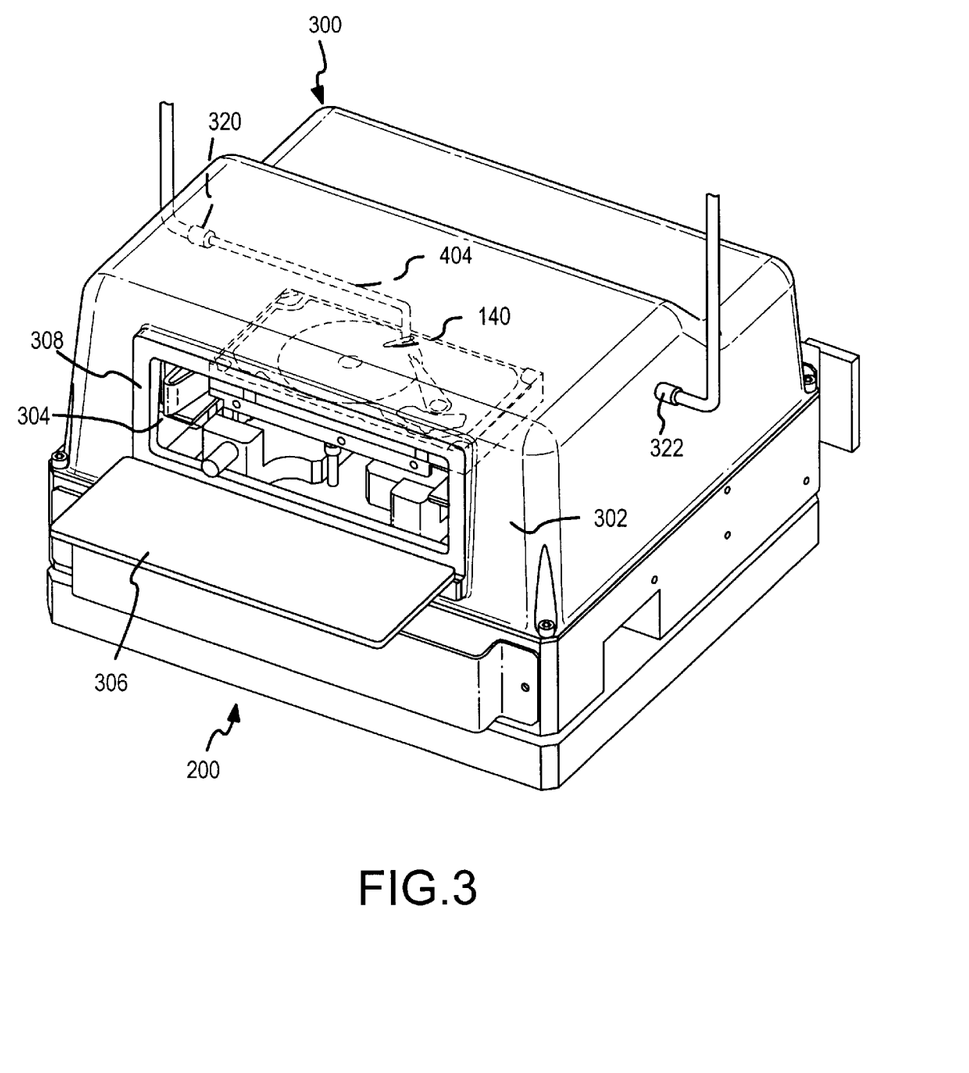
FIG. 3 is a perspective view of the STW of FIG. 2 illustrating a cover for creating a sealed environment within the STW as well as an inflow line for filling the STW with a low-density gas and an outflow line for recovering the low-density gas.

Referring now to FIGS. 2–3, a servo track writer ("STW") 200 is shown where the disc drive 100 has been mounted within the STW 200. The STW 200 shown in FIGS. 2–3 utilizes the actuator assembly 110 and the heads 118 (FIG. 1) of the disc drive 100 to write servo information to one (in the case of a dedicated servo system) or all (in the case of an embedded servo system) of the surfaces of the discs 108. Specifically, during manufacture of the disc drive 100, the drive is loaded within the STW 200 so that an electrical and mechanical connection is formed between the drive 100 and the STW 200. The STW then powers up the disc drive 100 so that the discs 108 are spinning at normal operating speed before writing a clock pattern to the outer perimeter of the top disc 108 as described above using a separate clock head (not shown). The clock pattern is used to synchronize the operation of the STW so that the heads 118 are activated at the proper time to write servo information to the disc surfaces. The STW next writes a first servo track at one extreme of the discs 108 and then pushes the actuator assembly 110 so that the heads 118 move a predetermined distance across the disc surface to a new track location. Once the STW confirms the position of the heads 118 (both laterally using a position detecting system and circumferentially using the information received from the clock head), the heads 118 are activated to write servo information at the new track location. This process continues until the heads 118 have moved across the entire surface of the discs 108 so that each disc (in the case of embedded servo systems) or a single disc (in the case of dedicated servo systems) contains the required servo patterns. Once the servo information is completely written, the disc drive 100 is removed from the STW 200 and the openings formed in the disc drive 100 (e.g., the opening 140 in the top cover 104) for writing the servo patterns are closed to create a sealed interior within the disc drive 100.

The STW 200 preferably includes a mounting fixture 202 having a granite block 204 and a mounting plate 206 with a calibrated, level top surface 208 that serves as a mechanical reference for the STW 200. A mounting base 210 includes an upper clamp plate 212 and plurality of clips 214 for securing the disc drive 100 within the STW 200. The disc drive 100 is preferably loaded into the STW 200 by robotic means to ensure that the drive 100 is properly seated within the STW 200. It is preferred that the drive 100 be fixed and level within the STW 200 prior to the start of the servo writing process.

A pusher block assembly 220 (shown schematically in FIG. 4) is preferably positioned below the disc drive 100 and includes a pusher pin 222 (FIG. 4) that extends upward through an opening in the disc drive base 102 to contact the actuator assembly 110. It is this pusher pin 222 that is responsible for moving the actuator arms 114 and thus the heads 118 across the disc surfaces during the servo writing process. A position detecting system 230 (not shown separately in FIG. 2 but shown schematically in FIG. 4) determines the actual position of the heads 118 using detection means such as a laser interferometer that directs a laser beam through the opening 140 in the top cover 104 of the disc drive 100. The position detecting system 230 provides position correction signals to a controller 240 (shown schematically in FIG. 4) which, in turn, directs the operation of the pusher block assembly 220. As the above-described operation of the STW 200 is conventional, no further description of the servo writing process is deemed necessary for the purposes of explaining the present invention.

Previously, the STW 200 shown in FIG. 2 has been left open to allow for easy insertion and removal of the disc drive 100 from the STW 200. Because servo track writing takes place during manufacture of the disc drive 100 in a clean room facility, there was no need to cover or enclose the STW 200. However, FIG. 3 illustrates the STW 200 of FIG. 2 with the addition of a cover 300 fixed to the mounting plate 206 of the STW 200. The cover 300 is preferably sculpted to define the smallest possible interior environment without interfering with the operation of the different STW components. The cover 300 includes a front face 302 defining an opening 304 for receiving the disc drive 100 within the interior environment defined by the STW 200 and the cover 300. A door 306 is preferably hinged along a bottom edge so that the door 306 may be closed to seal the drive 100 within the covered STW 200. In one preferred embodiment, a motor (not shown) can be used to automatically open and close the door 306 so that the door can be used in conjunction with robotic means for automatically loading and retrieving the drive 100 from the covered STW 200. A seal 308 around the periphery of the opening 304 acts in conjunction with the door 306 to form a substantially sealed internal environment within the covered STW 200 when the door 306 is closed.

As explained in greater detail below, one of the purposes of the cover 300 is to allow for recovery of helium (or another low-density gas) that is introduced into the disc drive 100 during the servo writing process. Specifically, while helium gas is preferred, other low-density gases may be used provided that the gas has a lower density than air. In a preferred embodiment, the gas will have a density that is approximately 20 percent that of air. The cover 300 preferably includes an inflow port 320 and an outflow port 322 (FIGS. 3 and 4) for respectively introducing helium into and recovering helium from the interior environment of the STW 200. The single outflow port 322 ensures that all the expended helium is directed to a helium gas recovery system which is used to separate the helium gas from air. Such a recovery system is necessary due to the relatively high cost of helium gas that is certified for use in a class 10 clean room (i.e., less than 30 parts-per-million hydrocarbons, particulates less than 0.2 microns, etc.). The present invention thus allows for the efficient and cost-effective use of relatively high concentrations of helium gas within the disc drive 100 during the servo writing process.

Figure 4:
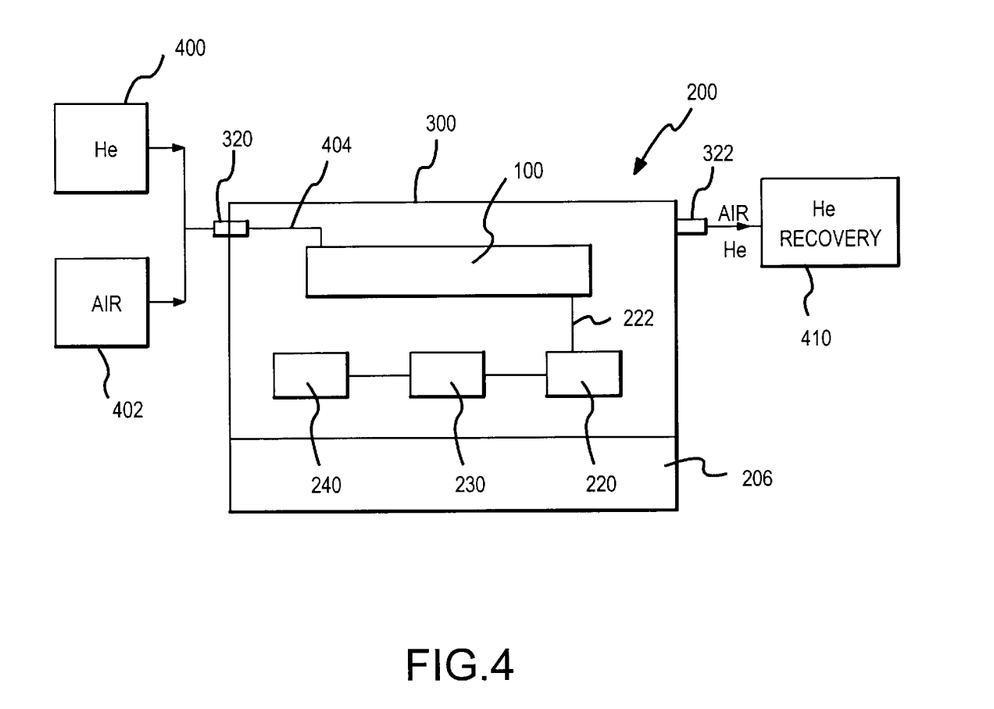
FIG. 4 is a schematic diagram illustrating a helium recovery system used in combination with the STW shown in FIG. 3.

As best shown in the schematic view of FIG. 4, the present invention utilizes pressurized sources of both helium 400 and air 402. These sources alternately feed the inflow port 320 according to the below-described method to first fill the STW 200 with helium and then to flush the helium from the STW. The inflow port 320 is preferably connected to an opening in the disc drive 100 (such as the opening 140 shown in FIG. 1) by an interior conduit 404. In this manner, the helium gas is introduced directly into the interior of the disc drive 100 so that the concentration of helium gas is quickly brought up to the desired level (preferably greater than 50 percent and, more preferably, 95–99 percent). However, because the disc drive 100 includes a number of openings to facilitate the servo writing process described above, the helium leaks from the drive 100 and tends to quickly fill the enclosed STW 200. Helium is therefore constantly introduced into the drive 100 through the inflow port 320 at a pressure and flow rate (e.g., 8 standard cubic feet per hour ("SCFH")) sufficient to force the air within the STW out through the outflow port 322. The mixture of air and helium gas exiting the STW is directed from the outflow port 322 to a helium recovery system 410 so that the relatively expensive helium gas can be separated from the air and reused. The helium recovery system 410 represents one of many known types of gas recovery systems, and the particular design or construction of the helium recovery system 410 is not important to the present invention. Thus, the operation of the helium recovery system 410 will not be explained in any further detail.

Because the helium gas (or other low-density gas) used during the servo writing process must meet the purity and particulate requirements of a class 10 clean room noted above, it is the use of the cover 230 and the helium recovery system 410 that allows the disc drive and the STW to be filled with relatively high concentrations of helium in a cost-effective manner. However, the use of high helium concentrations while writing servo patterns within a disc drive 100 creates problems of its own since the heads 118 (e.g., the air bearing sliders) are designed for operation within an air environment rather than a helium environment. Specifically, due to the relatively to low density of the helium gas, the heads 118 will fly at a much lower altitude over the discs in a helium environment than in the air environment for which they were designed. This lower altitude provides a smaller margin of safety when starting and stopping the disc drive (i.e., when loading and unloading the heads from the surfaces of the discs). The present invention addresses those problems by using a preferred servo track writing procedure as described below.

Figure 5:
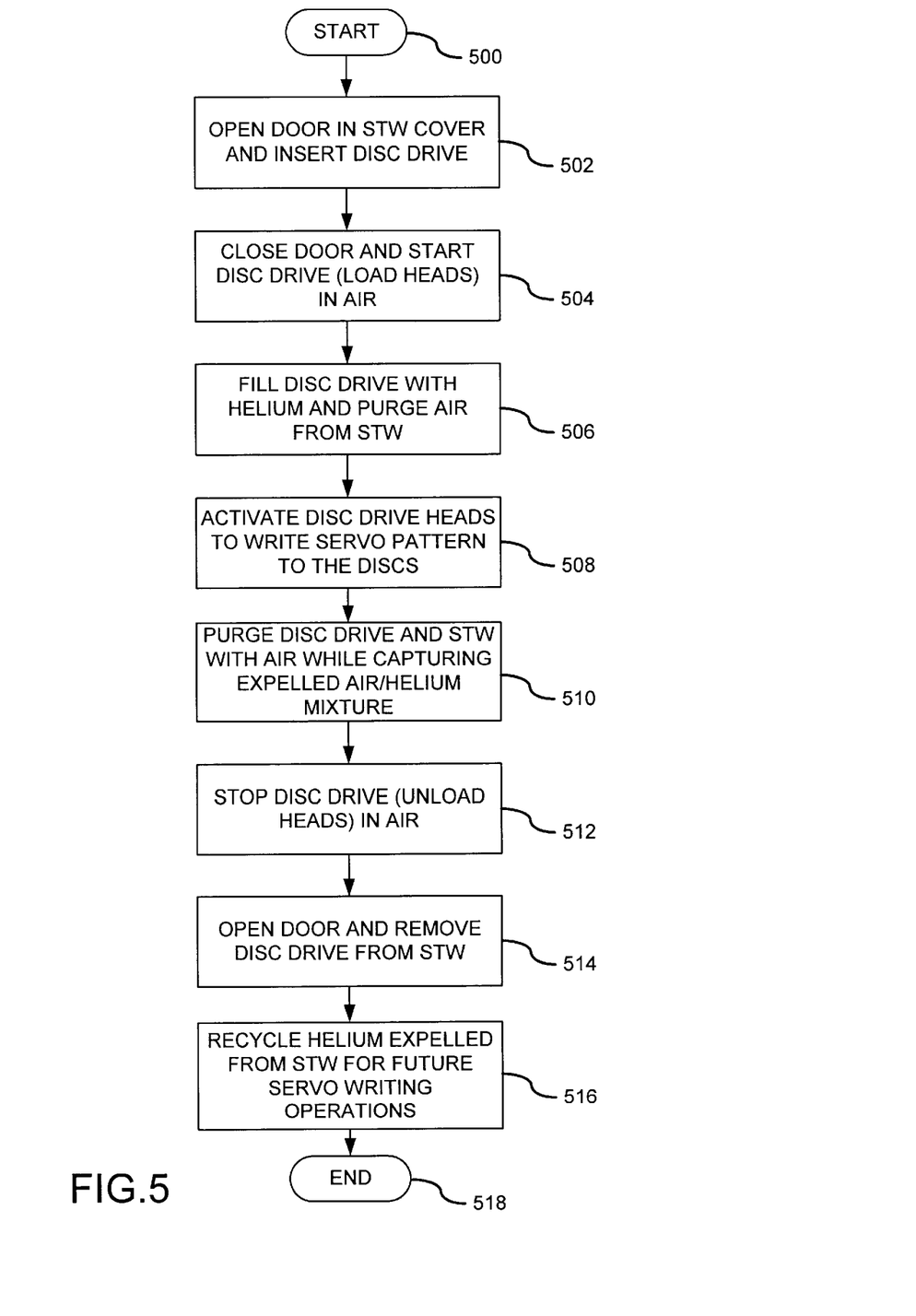
FIG. 5 is a flow chart of a general method of writing servo information on discs using a STW filled with a low-density gas in accordance with a preferred embodiment of the present invention.

Referring now to FIG. 5, a preferred method of writing servo patterns to the discs 108 of an assembled disc drive 100 is disclosed. The method starts at 500 and proceeds to operation 502 where the door 306 of the cover 300 is opened to accept the assembled disc drive 100. At this point, the interior of the STW 200 is filled with air, albeit the highly purified air of a class 10 clean room. Additionally, as noted above, the disc drive 100 is not sealed but rather includes a number of openings in the top cover 104 and/or the base 102 to facilitate movement and detection of the disc drive heads 118 during the servo writing procedure.

Next, in operation 504, the door 306 is closed to seal the STW 200 and the disc drive 100 is powered up so that the heads 118 are loaded onto the discs 108 in a typical air environment. That is, the heads 118 are either loaded onto the discs 108 from a load/unload ramp or, as shown in FIG. 1, are allowed to lift off of the park zone 120 of the discs 108 as the discs spin up to their normal operating speed. In either event, the disc drive 100 is allowed to reach a normal operating state while the interior of the disc drive is filled with air.

In the next step 506, the helium source 400 is activated to direct helium gas through the inflow port 320 where the interior conduit 404 directs the helium gas to an opening formed in the disc drive 100. In the preferred embodiment, the conduit 404 is directly inserted within the opening 140 (FIG. 1) in the top cover 104, although it is understood that the conduit 404 could be inserted into any other opening formed within the disc drive. The helium gas is preferably directed into the drive at a flow rate of 8 SCFH, and step 506 continues until a helium concentration of at least 95 percent is preferably obtained within the disc drive 100. While a separate sensor may be used to determine actual (real-time) helium concentrations within the drive 100, it is preferable to experimentally determine the time required to reach the desired concentration level at the prescribed flow rate.

As the helium concentration within the disc drive 100 continues to rise, the helium escaping from the drive 100 tends to fill the interior of the covered STW 200 so that the air within the STW is driven out the outflow port 322. Additionally, the evacuation of the air from the STW is preferably aided by setting the helium recovery system 410 to pull a partial vacuum within the STW. For example, for a helium flow rate of 8 SCFH through the inflow port 320, the helium recovery system 410 is preferably set to pull gas through the outflow port 322 at a rate of 13 SCFH. This ensures that substantially all of the air within the STW 200 will be evacuated so that preferable helium concentrations of 95–99 percent may be obtained inside the covered STW 200 within a relatively short amount of time. Depending on how "airtight" the covered STW 200 is (i.e., depending on whether the cover 300 can prevent air from leaking back into the STW once the desired helium concentration has been obtained), the helium source 400 may be deactivated and the outflow port 322 may be closed prior to the initialization of the servo writing procedure. This embodiment would provide the "quietest" environment for writing the servo patterns on the disc surfaces since there would be no continuous flow of helium gas into the disc drive 100 during the servo writing procedure. Alternatively, if necessary to maintain the desired helium concentration, the helium source 400 and the helium recovery system 410 may be operated continuously during the servo writing process in order to compensate for any leakage of the helium gas from the covered STW 200.

The method continues at operation 508 where servo patterns are written to the discs 108 once the helium concentration has stabilized at the desired value. That is, once the disc drive is substantially filled with helium so that drag-induced vibrations are significantly reduced or eliminated, the STW 200 commands the heads 118 of the disc drive to write the servo patterns to the designated disc (dedicated servo) or discs (embedded servo). The ability to write the servo patterns in a helium environment reduces the types of errors described above and permits the disc tracks to be written at a higher density, thereby resulting in a greater storage capacity for the disc drive 100.

In the next step 510, once the servo writing process has been completed, and while the drive 100 is still spinning the discs 108 at their normal operating speed, the helium flow from the source 400 is halted and the air source 402 is activated to direct a flow of air through the inflow port 320 to purge the helium from the disc drive. As noted above, the flow of air is preferably kept at 8 SCFH while the helium recovery system 410 preferably maintains the flow out of the STW 200 at 13 SCFH so that the helium will be quickly purged and replaced by air. The mixture of helium and air exiting through the outflow port 322 is captured by the helium recovery system 410 and the helium is separated from the air for reuse in future servo track writing cycles.

Next, the method continues at operation 512 where the disc drive is powered down in an air environment. It is necessary to wait until substantially all of the helium has been purged from the disc drive 100 before powering down the discs for the same reasons noted above in relation to powering up the disc drive: i.e., to provide sufficient safety margins for the air bearing slider prior to moving the heads either to the park zone 120 (FIG. 1) in the case of a contact start/stop ("CSS") drive, or prior to unloading the heads onto a ramp (not shown) in a load/unload disc drive. Using the example of a CSS drive, if the disc drive 100 was powered down in a helium environment, the heads would land in the park zone 120 while the discs were still spinning at a relatively high rate of speed, and the increased friction between the discs and the air bearing slider could damage the fragile heads 118. Alternatively, in the case of a load/unload disc drive, if the drive 100 was powered down in a helium environment, the heads 118 would be flying at a much lower altitude than in a normal air environment when the heads were offloaded from the discs to the ramp (not shown). This reduced fly height could lead to inadvertent contact between the heads 118 and the outer circumference of the spinning discs 108 (i.e., a "head crash") during the unloading process. Thus, regardless of whether the drive 100 is a CSS drive or a load/unload drive, step 512 ensures that the helium is purged from the disc drive 100 so that the drive may be powered down in a normal, safe manner.

In operation 514, the door 306 of the cover 300 is opened and the drive 100 is removed from the STW 200. Next, in operation 516, the helium recovered by the unit 410 is recycled and returned to the source 400 for subsequent servo track writing operations. The method then terminates at step 518, and the entire process repeats itself with a new disc drive at step 500.

The above description of the STW 200 and the cover 300, as well as the method described in FIG. 5, applies primarily to a servo track writer that works in conjunction with a pre-assembled disc drive 100 and that utilizes the actuator assembly 110 and the heads 118 of the disc drive 100 to write servo patterns to discs 108 that are already installed within the drive. However, the present invention may also be used with dedicated servo track writers that write servo patterns to a plurality of discs prior to those discs being assembled within a disc drive. This type of servo track writer 600 is shown in FIG. 6 and is referred to hereafter as a multi-disc writer ("MDW") to differentiate it from the more conventional STW 200 shown in FIG. 2.

The MDW 600 sits upon a substantially immobile and horizontally positioned platform or granite slab 602. An actuator assembly 604 is connected to the platform 602 via a slide mechanism 606 for lateral movement (as indicated by arrow 608) over the platform 602 between a servo writing position (not shown) and a disc loading and unloading position as shown in FIG. 6. The actuator assembly 604 includes an E-block 612 having a plurality of actuator arms 614 for positioning a plurality of servo recording heads (not separately shown in FIG. 6) to write servo patterns onto a plurality of target discs 620. The discs 620 are preferably secured to a spindle motor hub assembly 622 in a vertical orientation and are loaded as a stack 624 on a removable spindle hub 626 so that the hub 626 and the stack of discs 620 can be detached from a spindle motor 628 to ease the process of loading and unloading the discs 620 from the spindle motor hub assembly 622.

Once the discs 620 have been loaded on the spindle motor hub assembly 622, the actuator assembly 604 is preferably moved laterally along the platform 602 (in the direction of arrow 608) toward the spindle motor hub assembly 622. A comb (not shown in FIG. 6) is preferably used to maintain proper separation between the heads at the ends of the actuator arms 614 so that the actuator assembly 604 and the disc stack 624 on the spindle motor hub assembly 622 may merge without unintentional contact between the heads and the discs 620. Once the actuator assembly 604 is locked into the servo writing position so that the heads are positioned within the gaps between adjacent discs 620, the comb (not shown) is rotated away from the E-block 612 to allow the heads to engage their respective discs as a result of the bias force provided by flexures at the ends of each actuator arm 614. Of course, the servo writing heads do not make physical contact with the respective disc surfaces since the spindle motor 628 is activated to spin the discs 620 at a predetermined rate prior to disengaging the comb.

Figure 6:
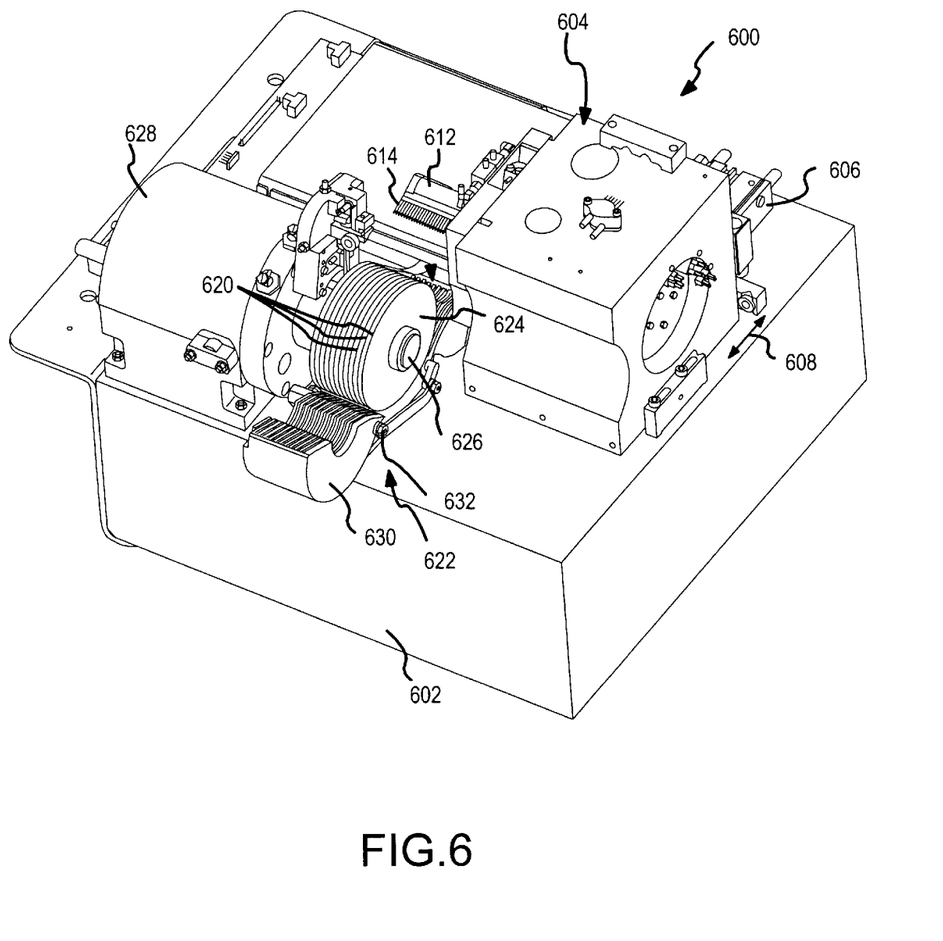
FIG. 6 is a perspective view of a dedicated STW in accordance with a preferred embodiment of the present invention for writing servo information to a plurality of discs prior to assembly within a disc drive, referred to herein as a multi-disc writer.

In previous versions of the MDW 600 shown in FIG. 6, the heads "fly" on an air bearing a predetermined distance over the surface of the discs. However, as with the STW 200 shown in FIG. 2, the MDW 600 also suffers from drag-induced vibrations due to aerodynamic drag forces experienced by the plurality of discs 620 rotating at a predetermined high speed within the MDW 600. Previous attempts to reduce the aerodynamic drag force on the discs 620 have included the use of an air dam 630 that can be pivoted into position about a pivot assembly 632 prior to activation of the spindle motor 628. The air dam 630 defines a series of gaps for receiving each of the discs 620, thereby stripping the air away from the surface of the disc as a portion of the disc rotates through the gap. However, even with the use of the air dam 630, the MDW 600 still suffers from undesirable drag-induced vibrations which tends to limit the track density of the servo patterns that can be written to the discs.

Figure 7:
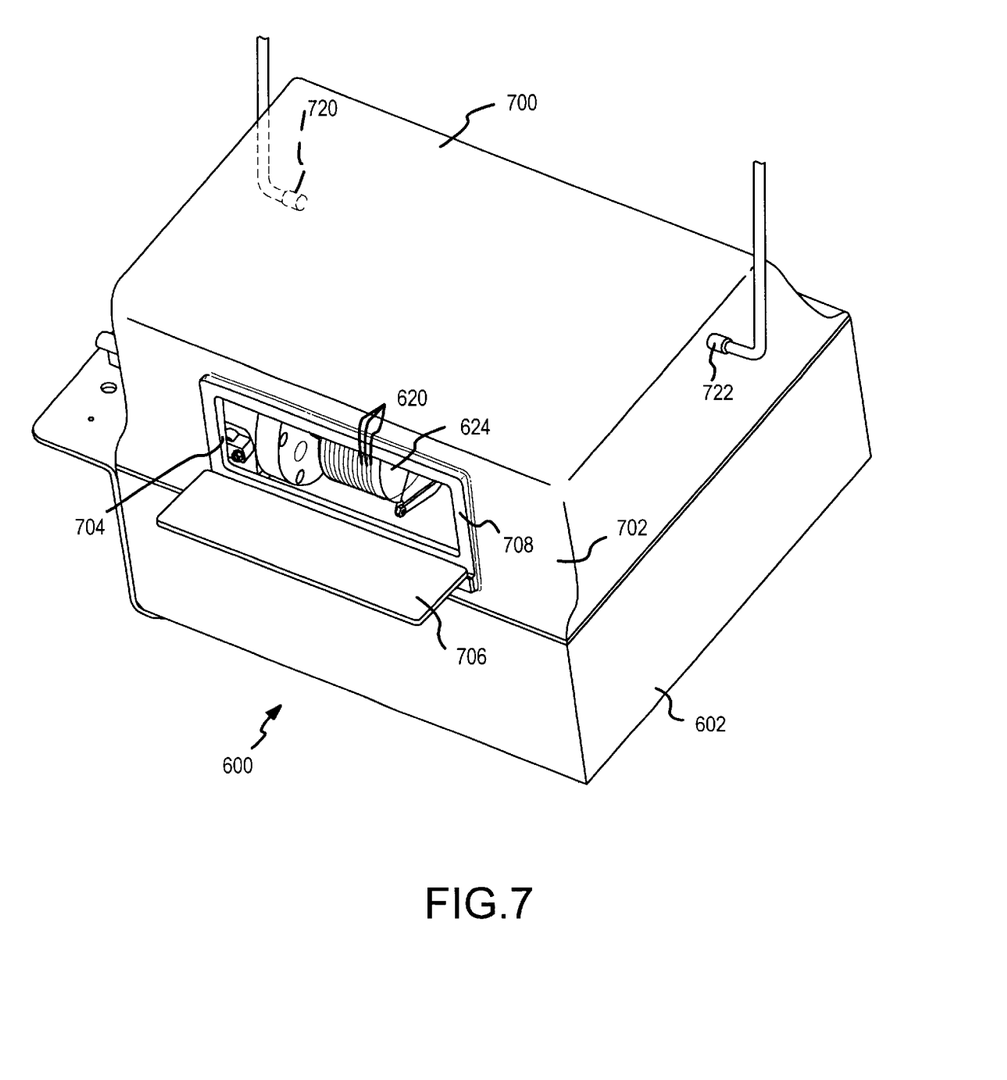
FIG. 7 is a perspective view of the MDW of FIG. 6 illustrating a cover for creating a sealed environment within the MDW as well as an inflow line for filling the MDW with a low-density gas and an outflow line for recovering the low-density gas.

Referring to FIG. 7, the MDW 600 of the present invention includes a cover 700 extending over the entirety of the platform 602. The cover 700 is similar to the cover 300 shown in FIG. 3 and includes a front face 702 defining an opening 704 for receiving the disc drive stack 624 on the detachable spindle hub 626. A door 706 is preferably hinged along a bottom edge so that the door 706 may be closed to seal the disc stack 624 within the covered MDW 600. In one preferred embodiment, a motor (not shown) can be used to automatically open and close the door 706 so that the door can be used in conjunction with robotic means for automatically loading and retrieving the disc stack 624 from the covered MDW 600. A seal 708 around the periphery of the opening 704 acts in conjunction with the door 706 to form a substantially sealed interior environment within the covered MDW 600 when the door 706 is closed.

The cover 700 includes an inflow port 720 and an outflow port 722 similar to those found on the STW cover 300 shown in FIGS. 3 and 4. The outflow port 722 is connected to a helium recovery system (not shown in FIG. 7), while the inflow port 720 is preferably connected to a source of pure helium (not shown in FIG. 7) that satisfies class 10 clean room requirements as described above. In one preferred embodiment, the inflow port 720 may be connected to both a source of air and a source of helium when the servo writing heads of the MDW 600 are designed for use in an air environment. That is, the MDW 600 could follow the process shown in FIG. 5 where the MDW is first brought up to speed (and the heads loaded onto the discs 620) in an air environment before the air is forced out of the enclosed MDW 600 by a flow of helium through the inflow port 720. The servo writing process would then take place in a helium environment (having a helium concentration greater than 50 percent and preferably 95–99 percent) before pumping air back into the MDW to flush the helium out through the outflow port 722 to a helium recovery system (not shown in FIG. 7). Once air has replaced the helium within the MDW 600, the heads can be unloaded from the discs 620 and the actuator assembly 604 can be returned to the load/unload position shown in FIG. 6.

However, the dedicated nature of the MDW 600 means that the servo writing heads need not be optimized for operation in an air environment. Rather, the heads, suspensions and actuator arms 614 of the MDW 600 may be specifically optimized for operation in a helium environment so that the heads do not need to be loaded and unloaded from the discs 620 in an air environment. In this case, a simpler process may be followed where helium is pumped into the covered MDW 600 immediately after the door 706 is closed. Once a desired helium concentration is obtained within the covered MDW 600 shown in FIG. 7 (e.g., 95–99 percent), the discs 620 may be spun up to operating speed and the actuator assembly 604 may be moved into position to initiate the servo writing process. Similarly, when the servo writing process is completed, the discs 620 may be immediately spun down and the servo writing heads unloaded from the discs 620 without having to wait for the helium to be pumped out of the MDW 600. However, air is still preferably pumped into the MDW 600 before opening the door 706 and removing the stack 624 of discs 620 so that the valuable helium gas within the covered MDW 600 may be recovered and recycled by the helium recovery system (not shown in FIG. 7).

Because the helium gas serves to reduce drag-induced vibrations within the MDW 600, the air dam 630 shown in FIG. 6 is no longer required with the covered MDW shown in FIG. 7. Furthermore, while a vertically-oriented MDW 600 is illustrated, it is understood that the precise design of the MDW is not crucial to the present invention and that any other MDW (including a horizontally-oriented MDW) may be used with the present invention provided that the MDW is capable of being covered as shown in FIG. 7.

Described in another way, a method in accordance with an exemplary preferred embodiment of the present invention writes servo patterns on a disc (such as 108 and 620) in a servo track writer ("STW") (such as 200 and 600) filled with a low-density gas to reduce drag-induced vibrations during the servo writing process. The method includes loading the disc (such as 108 and 620) within the STW (such as 200 and 600) and sealing the STW (such as in operation 502) to form an enclosed interior environment. The sealed STW (such as 200 and 600) is then filled with a low-density gas (such as in operation 506) until the concentration of the low-density gas within the STW reaches a predetermined level. The STW is then activated (such as in operation 508) to write servo patterns on the disc (such as 108 and 620) within the low-density gas environment of the STW. In one preferred embodiment, the predetermined concentration of the low-density gas is at least 50 percent.

The disc (such as 108) may be preinstalled within a disc drive (such as 100) so that the loading step (such as operation 502) comprises loading the disc drive (such as 100) within the STW (such as 200). Alternatively, the STW may comprise a multi-disc writer ("MDW") (such as 600) having a plurality of dedicated servo writing heads such that the loading step (such as operation 502) comprises loading a stack of discs (such as 620) within the MDW (such as 600). The STW (such as 200 and 600) includes a cover (such as 300 and 700) having an opening (such as 304 and 704) for loading either the disc drive (such as 100) in the STW (such as 200) or for loading a disc stack (such as 624) within the MDW (such as 600). The cover (such as 300 and 700) includes a door (such as 306 and 706) for sealing the opening (such as 304 and 704).

The method may further include the step of purging the STW (such as 200 and 600) of the low-density gas (such as in operation 510) and then recycling the purged gas (such as in operation 516). In one embodiment, the low-density gas comprises helium. The recycling step (such as operation 516) of the method includes directing the purged low-density gas from the STW (such as 200 and 600) to a gas recovery system (such as 410) to separate the low-density gas from air.

When the STW (such as 200) supports a separate disc drive (such as 100), the method further includes the step of powering up the disc drive (such as 100) in an air environment (such as in operation 504) prior to filling the STW with the low-density gas (such as in operation 506), and then powering down the disc drive (such as 100) in an air environment (such as in operation 512) after purging the low-density gas from the STW (such as in operation 510). On the other hand, when the STW is a MDW (such as 600) having a plurality of dedicated servo writing heads optimized for use in a low-density gas, the method includes the step of loading the dedicated servo writing heads onto the surfaces of the discs (such as 620) subsequent to the step of filling the MDW (such as 600) with the low-density gas (such as in operation 506). Furthermore, the dedicated servo writing heads are preferably unloaded from the surfaces of the discs (such as 620) prior to the step of purging the low-density gas (such as in operation 510) from the MDW (such as 600).

Another embodiment of the present invention may be described as a servo writing assembly for writing servo patterns on a disc (such as 108 and 620) in a low-density gas environment. The assembly includes a servo track writer ("STW") (such as 200 and 600) having a base (such as 202 and 602) adapted to support a spindle motor (such as 106 and 628) for rotating the disc (such as 108 and 620) and a servo writing head (such as 118) for writing servo patterns on the rotating disc. A cover (such as 300 and 700) cooperating with the base (such as 202 and 602) forms an enclosed interior environment within the STW (such as 200 and 600). The cover (such as 300 and 700) includes a sealable opening (such as 304 and 704) for loading the disc within the STW. The cover further includes an inflow port (such as 320 and 720) for directing the low-density gas from the source (such as 400) into the interior environment of the STW (such as 200 and 600) prior to writing servo patterns on the disc and an outflow port (such as 322 and 722) to allow the low-density gas to be purged from the interior environment of the STW after the servo patterns have been written to the disc. In one embodiment, the assembly further includes a gas recovery system (such as 410) connected to the outflow port (such as 322 and 722) to separate the purged low-density gas from air.

In one embodiment of the servo writing assembly, the disc (such as 108), the spindle motor (such as 106) and the servo writing head (such as 118) are all preinstalled within a disc drive (such as 100) so that the disc drive (such as 100) is inserted through the sealable opening (such as 304) in the cover (such as 300) and fixed within the interior environment of the STW (such as 200). A conduit (such as 404) preferably connects the inflow port (such as 320) to an opening (such as 140) formed in the disc drive (such as 100) to direct the low-density gas to an interior of the disc drive. In another embodiment of the servo writing assembly, the STW (such as 600) includes a plurality of dedicated servo writing heads and the spindle motor (such as 628) supports a plurality of discs (such as 620) in a disc stack (such as 624) for simultaneous servo pattern writing to each disc. The disc stack (such as 624) is inserted through the sealable opening (such as 704) in the cover (such as 700) and fixed to the spindle motor (such as 628) within the interior environment of the STW (such as 600).

Yet another embodiment of the present invention may be described as a servo writing assembly having a servo track writer ("STW") (such as 200 and 600) connected to a source of low-density gas (such as 400) for filling the STW with low-density gas prior to writing servo patterns on a disc (such as 108 and 620). The servo writing assembly includes means for recovering the low-density gas subsequent to writing the servo patterns on the disc. The gas recovery means preferably includes means (such as 402) for purging the low-density gas from the STW (such as 200 and 600) and means (such as 410) for separating the low-density gas from air. In one embodiment, the disc (such as 108) is preinstalled within a disc drive (such as 100) and the STW (such as 200) includes a base (such as 202) for supporting the disc drive (such as 100), and the means for recovering the low-density gas includes a cover (such as 300) mating with the base (such as 202) to define a sealed interior environment within the STW (such as 200). The cover (such as 300) includes a sealable opening (such as 304) to allow insertion of the disc drive (such as 100) within the STW. In an alternative embodiment, the STW (such as 600) includes a base (such as 602) having a plurality of dedicated servo writing heads for writing servo patterns simultaneously to a plurality of discs (such as 620) in a disc stack (such as 624). The means for recovering the low-density gas then includes a cover (such as 700) mating with the base (such as 602) to define a sealed interior environment within the STW (such as 600), and the cover (such as 700) has a sealable opening (such as 704) to allow insertion of the disc stack (such as 624) within the STW (such as 600).

It will be clear that the present invention is well adapted to attain the ends and advantages mentioned as well as those inherent therein. While embodiments have been described for purposes of this disclosure, various changes and modifications may be made which are well within the scope of the present invention. For example, while the low-density gas preferably comprises helium, alternative low-density gases may be used provided such gases are purified for use within a clean room environment. Additionally, while specific embodiments of the disc drive 100, the STW 200 and the MDW 600 have been described, the present invention is not limited to any specific disc drive or servo writer design. Rather, the invention may work with any servo writer provided that the servo writer may be covered to allow a low-density gas to be filled and subsequently purged from the interior of the covered servo writer. Furthermore, many different technologies are available for recycling helium or alternative low-density gases, and the present invention is not limited to any single helium recovery technique. Numerous other changes may be made which will readily suggest themselves to those skilled in the art. Accordingly, all such modifications, changes and alternatives are encompassed in the scope of the invention disclosed and as defined in the appended claims.

What is claimed is:

1. A servo writing assembly for writing servo patterns on a disc in a low-density gas environment comprising:
   a servo track writer ("STW") having a base adapted to support a spindle motor for rotating the disc and a servo writing head for writing servo patterns on the rotating disc; and
   a cover cooperating with the base to form an enclosed interior environment within the STW, wherein the cover includes a sealable opening for loading the disc within the STW, an inflow port for directing the low density gas into the interior environment of the STW while writing servo patterns on the disc and an outflow port to allow the low-density gas to be purged from the interior environment of the STW after the servo patterns have been written to the disc.

2. The servo writing assembly of claim 1 further comprising a gas recovery system connected to the outflow port to separate the purged low-density gas from air.

3. The servo writing assembly of claim 2 wherein the disc, the spindle motor and the servo writing head are all preinstalled within a disc drive, and wherein the disc drive is inserted through the sealable opening in the cover and fixed within the interior environment of the STW.

4. The servo writing assembly of claim 3 further comprising a conduit connecting the inflow port to an opening formed in the disc drive to direct the low-density gas to an interior of the disc drive.

5. The servo writing assembly of claim 2 wherein the STW includes a plurality of dedicated servo writing heads and the spindle motor supports a plurality of discs in a disc stack for simultaneous servo pattern writing to each disc, and wherein the disc stack is inserted through the sealable opening in the cover and fixed to the spindle motor within the interior environment of the STW.

6. A method for writing servo patterns to a disc, comprising:

rotating the disc in a low-density atmosphere comprising Helium at a concentration of at least 95%; and writing the servo patterns to the disc during the rotating step.

7. The method of claim 6, wherein the rotating and writing steps are carried out in a multi-disc writer (MDW) and wherein the method further comprises subsequently removing the disc on which the servo patterns are written from the MDW and installing said disc onto a spindle motor in a disc drive.

8. The method of claim 6, further comprising a prior step of installing the disc onto a spindle motor in a disc drive so that the rotating and writing steps are carried out in said disc drive.

9. The method of claim 6, wherein the rotating step comprises:

initiating rotation of the disc in an ambient air atmosphere so that a data transducing head achieves aerodynamic support adjacent the disc by recirculating fluidic currents in the air atmosphere; and while continuing said rotation, replacing the air atmosphere with the low-density atmosphere so that the head maintains aerodynamic support adjacent the disc by recirculating fluidic currents in the low-density atmosphere.

10. The method of claim 9, further comprising a subsequent step of replacing the low-density atmosphere with a second ambient air atmosphere so that the head continues to maintain aerodynamic support adjacent the disc by recirculating fluidic currents in the second air atmosphere after the writing step.

11. A method for writing servo patterns to a disc, comprising:

rotating the disc in an ambient air atmosphere so that a data transducing head achieves aerodynamic support adjacent the disc by recirculating fluidic currents in the air atmosphere;

while continuing said rotation, replacing the air atmosphere with a low-density atmosphere comprising an inert gas of selected concentration and having a density less than said air atmosphere so that the head maintains aerodynamic support adjacent the disc by recirculating fluidic currents in the low-density atmosphere; and using the head to write the servo patterns to the disc while the head is operated in the low-density atmosphere.

12. The method of claim 11, further comprising a subsequent step of replacing the low-density atmosphere with a second ambient air atmosphere so that the head continues to maintain aerodynamic support adjacent the disc by recirculating fluidic currents in the second air atmosphere after the using step.

13. The method of claim 12, wherein the replacing the low-density atmosphere step further comprises employing a fluidic recovery system to capture the low-density atmosphere for reuse.

14. The method of claim 11, further comprising a step of subsequently writing user data to the disc in the presence of an ambient air atmosphere.

15. The method of claim 11, wherein the low-density atmosphere comprises Helium gas at a concentration of at least 95%.

* * * * *

UNITED STATES PATENT AND TRADEMARK OFFICE
CERTIFICATE OF CORRECTION

PATENT NO.    : 6,785,082 B2
DATED         : August 31, 2004
INVENTOR(S)   : Louis J. Fioravanti et al.

It is certified that error appears in the above-identified patent and that said Letters Patent is hereby corrected as shown below:

Title page,
Item [75], Inventors, replace "Louis John Fiorvanti" with -- Louis John Fioravanti --.

Column 8,
Line 17, replace "relatively to low" to -- relatively low --.

Signed and Sealed this

Twenty-second Day of March, 2005

JON W. DUDAS
*Director of the United States Patent and Trademark Office*